(12) United States Patent
Ueno (10) Patent No.: US 7,706,839 B2
(45) Date of Patent: Apr. 27, 2010

(54) INFORMATION PROCESSING DEVICE, INFORMATION PROCESSING METHOD, AND INFORMATION PROCESSING PROGRAM

(75) Inventor: Mitsuhiro Ueno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 648 days.

(21) Appl. No.: 11/271,649

(22) Filed: Nov. 10, 2005

(65) Prior Publication Data

US 2006/0063565 A1 Mar. 23, 2006

Related U.S. Application Data

(63) Continuation of application No. PCT/JP03/06061, filed on May 15, 2003.

(51) Int. Cl.
*H04B 1/38* (2006.01)
(52) U.S. Cl. ..................... 455/558; 455/557
(58) Field of Classification Search .............. 455/557, 455/558, 412.1, 550.1
See application file for complete search history.

(56) References Cited

U.S. PATENT DOCUMENTS

| 7,280,847 B2 * | 10/2007 | Goldthwaite et al. ........ 455/558 |
| 2002/0006808 A1 | 1/2002 | Onaka et al. |
| 2002/0065106 A1 | 5/2002 | Bishop et al. |
| 2002/0103009 A1 | 8/2002 | Sato |
| 2002/0154632 A1 | 10/2002 | Wang et al. |

FOREIGN PATENT DOCUMENTS

| DE | 101 33 590 | 10/2002 |
| EP | 1 173 037 | 1/2002 |
| EP | 1 213 680 | 6/2002 |
| EP | 1 223 768 | 7/2002 |
| GB | 2 375 018 | 10/2002 |
| JP | 6-161842 | 6/1994 |
| JP | 2000-253108 | 9/2000 |
| JP | 2001-197194 | 7/2001 |
| JP | 2001-251394 | 9/2001 |
| JP | 2002-95038 | 3/2002 |
| JP | 2002-125020 | 4/2002 |
| JP | 2002-152354 | 5/2002 |
| JP | 2002-218536 | 8/2002 |
| JP | 2002-230487 | 8/2002 |
| JP | 2002-345046 | 11/2002 |

OTHER PUBLICATIONS

International Search Report dated Jun. 17, 2003.
Notification of Reason for Refusal dated Jul. 15, 2008, from the corresponding Japanese Application.
Decision of Refusal with partial translation dated Apr. 28, 2009, for the corresponding Japanese Application 2004-571855.

* cited by examiner

*Primary Examiner*—Sam Bhattacharya
(74) *Attorney, Agent, or Firm*—Katten Muchin Rosenman LLP (57) ABSTRACT

An information processing device including a communication device. The information device, an information processing method, and an information processing program use a plurality of SIM cards having different recorded information and enable reading of the information from the SIM cards and writing into the SIM cards, thereby improving the convenience of the SIM cards. The information processing device includes a communication device (48) communicating with an external communication device via a communication line and uses a plurality of SIM cards, SIM card I (361) and SIM card II (362) having different storage information. The information processing device includes an information processing part (CPU 40) for selecting a SIM card according to selection information specifying a SIM card and reading or writing SIM card information between the selected SIM card and the communication device.

7 Claims, 9 Drawing Sheets

INFORMATION PROCESSING DEVICE, INFORMATION PROCESSING METHOD, AND INFORMATION PROCESSING PROGRAM

CROSS-REFERENCE TO RELATED APPLICATIONS

This application is a continuation of International Application No. PCT/JP2003/006061, filed on May 15, 2003, now pending, herein incorporated by reference.

BACKGROUND OF THE INVENTION

1. Field of the Invention

The present invention relates to Personal Digital Assistants (PDA), Personal Handy-phone Systems (PHS), Personal Computers (PC), Handheld Personal Computers (Hand-held PC), mobile phones, other mobile terminals, information processing devices having a communication device, method of information processing and information processing program thereof, more specifically, an information processing device, a method of information processing and an information processing program thereof using a Subscriber Identity Module card (hereafter SIM card) for reading and writing recorded information from and to the SIM card having different recorded information such as subscriber information etc.

2. Description of the Related Art

The SIM card is an integrated circuit (IC) card having a subscriber information such as an identification number, a telephone number, a telephone directory, a telephone charge, etc. For a mobile terminal using the SIM card, a user purchases an optional mobile phone, and selectively signs a contract with a provider for obtaining the SIM card for installing the SIM card into the mobile phone for calling. A single mobile phone can be used for sharing by a plurality of SIM cards, if the SIM cards from a plurality of providers are obtained. Such SIM cards are applied in the mobile phone using Global System for Mobile communication (GSM).

Figure 1:
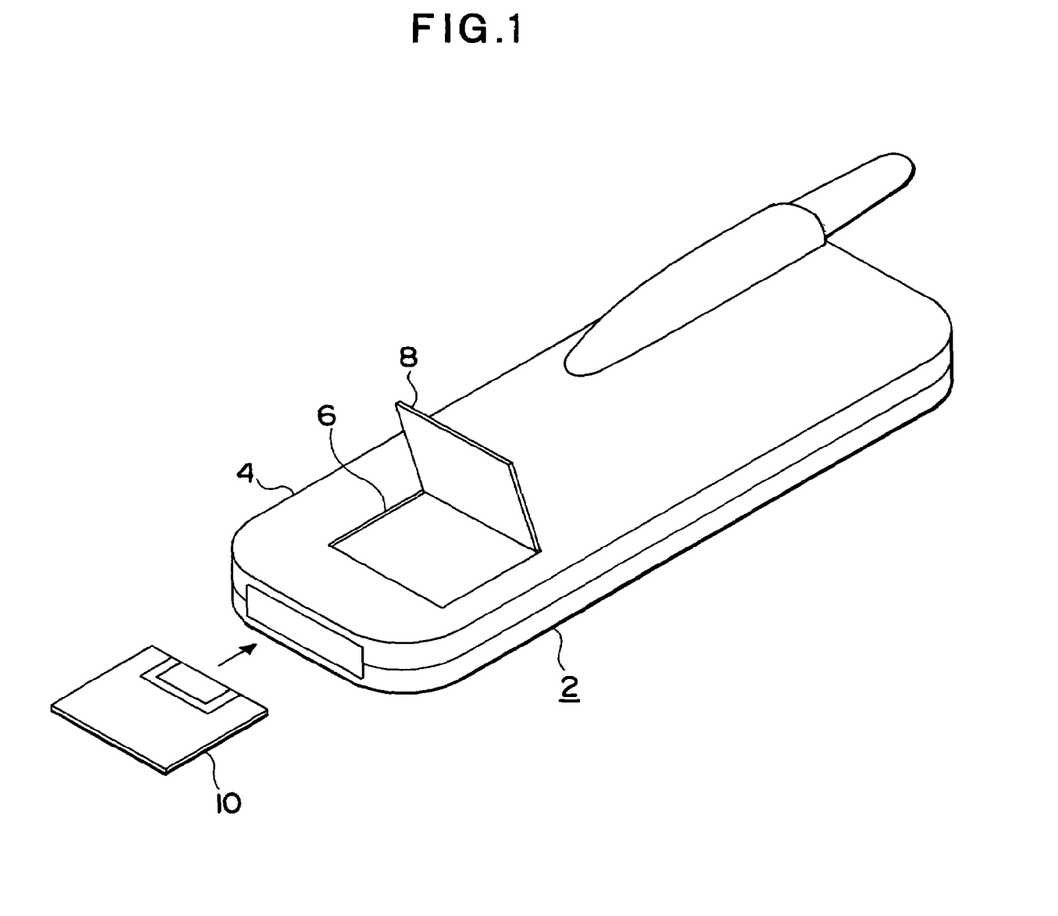
FIG. 1 is a perspective view showing a conventional mobile phone using a SIM card.
Figure 2:
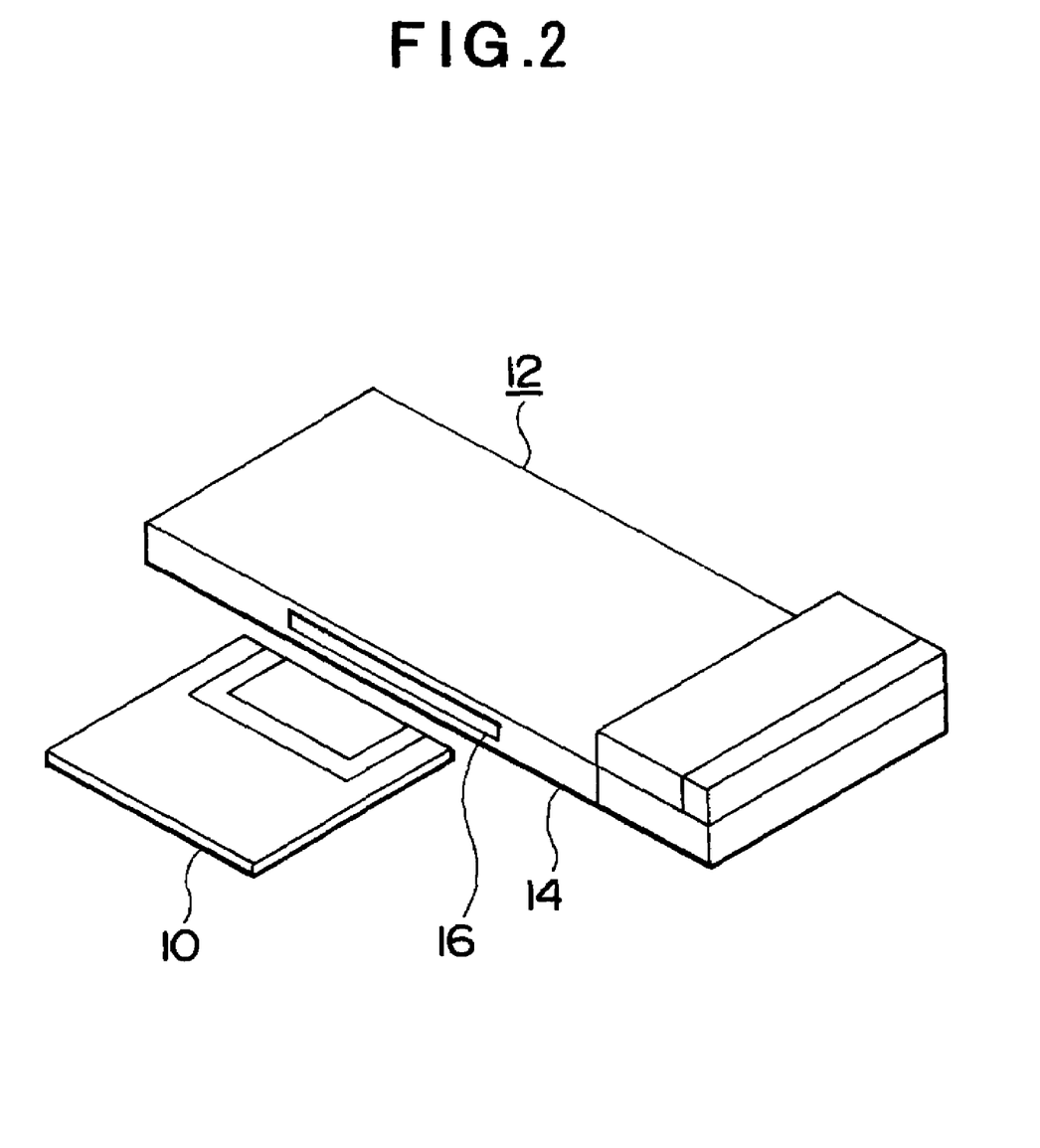
FIG. 2 is a perspective view showing a conventional mobile terminal using a SIM card.
Figure 3:
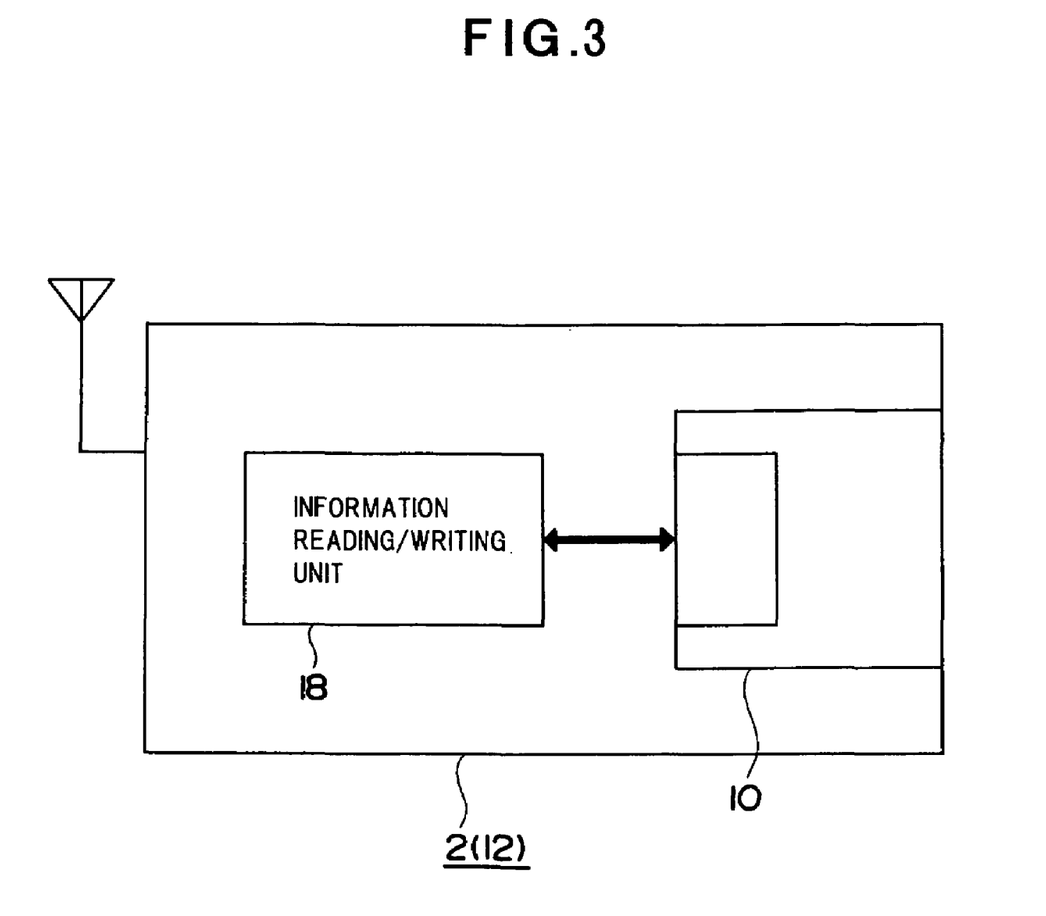
FIG. 3 is a block diagram showing a conventional structure of internal structure of a mobile phone or information terminal having a SIM card for writing/reading thereto and therefrom.

If the SIM card is used for a communication device using Wideband-Code Division Multiple Access (W-CDMA), as FIG. 1 shows, a card insertion opening 6 having a lid 8 is movably attached to open/close on a main body 4 of the mobile phone 2. The SIM card 10 is installed in the card insertion opening 6. For example, FIG. 2 shows, the SIM card 10 is installed into the slot 16 formed at a side of the card body 14 of a card-type information processing terminal 12. As FIG. 3 is a block diagram showing, for example, configuration of the mobile phone 2 or the information processing terminal 12 having an information reading/writing unit 18 inside the main body for reading/writing information from/to the SIM card 10.

Referring to mobile terminals using such SIM card, there are Japanese Patent Application Laid-open Publications No. 2002-125020, H06(1994)-161842, 2000-253108, 2001-251394 and 2002-152354.

The publication 2002-125020 discloses a communication terminal using the SIM card. The publication H06(1994)-161842 discloses an IC card as an external memory device or a computer using the IC card. The publication 2000-253108 discloses a mobile phone using an IC card for recording compressive/de-compressive image information, voice information therein. The publication 2001-251394 discloses a wireless terminal having an information memory card installed in the card receiving area, the information memory card has recorded image information and voice information therein and provided readably therefrom. The publication 2002-152354 discloses the SIM card installed under a battery, the battery has to be removed for installing the SIM card.

As FIG. 1 is a perspective view showing the backside of a mobile phone, in this figure, the lid 8 provided on the backside of the mobile phone 2 can open or close, or the battery can be removed for installing the SIM card 10. FIG. 2 is a perspective view showing the SIM card 10 installed in the slot 16 of the card-type information processing terminal 12. The SIM card can be attached or detached easily in such structures. However, if the SIM card is installed internal personal computer (PC) or other information processing device, the SIM card is hardly removed or installed as it is necessary for the device to be break down.

In addition, if a plurality of SIM cards having different recorded information therein are used, replacement of a selected SIM card and related operation corresponding to the replacement are necessary, which lacks in usability.

SUMMARY OF THE INVENTION

The present invention is provided to solve the above problems. It is an object of the present invention to provide an information processing device having improved usability by using a plurality of the SIM cards having different recorded information therein, a method of information processing thereof and an information processing program thereof.

This invention relates to the information processing device having a communication device, more particularly, it is an object of the present invention to provide a plurality of the SIM cards having different information therein and the function of reading/writing information to/from the SIM card thereby improving usability of the SIM cards.

In order to achieve the above object, according to the present invention there is provided an information processing device having a communication device which communicates with an external communication device through a communication network, comprising an information processing part, which selects a SIM card based on a selection information to specify said SIM card out of a plurality of SIM cards having different recorded information therein, and reads or writes information of said SIM card between said SIM card and said communication device. In this information processing device, the communication device is built in the housing, or it may be provided attachably/detachably in the housing. The information processing part selects a SIM card by a selecting process based on a selection information, and performs reading/writing processes between the SIM card selected by this process and the communication device.

According to this structure, a plurality of SIM cards having different recorded information such as subscriber information including an identification number, a telephone number, a telephone directly, a telephone charge, etc. can be installed in the information processing device. A SIM card to be used is selectively used out of the plurality of the SIM cards installed for performing reading/writing to/from between the SIM card and the communication device whereby varieties of services by service-providers can be selectively used therefore usability can be improved.

In order to achieve the above object, the information processing device may further comprises a plurality of card attaching parts by which the SIM cards are attached to a housing having at least said information processing part built-in; and reading/writing part, which reads/writes information of a SIM card between said SIM card and said communication device with respect to each card attaching part.

In order to achieve the above object, in the information processing device, said selection information may be entered from an input device of the information processing device, or obtained by an application program to be executed in the information processing device. According to the structure of the present invention, a SIM card can be selected not only by entering the selection information from an input device, the selection information can be automatically provided by an application program to be performed.

In order to achieve the above object, according to the present invention there is provided a method of information processing of an information processing device having a communication device which communicates with an external communication device, comprising the steps of storing a selection information in a storage part of said information processing device, wherein the selection information specifies a SIM card out of a plurality of SIM cards having different recorded information therein; and selecting the SIM card based on said selection information stored in the storage part, and reading or writing information of said SIM card between said SIM card and said communication device.

According to the above method of the present invention, a SIM card can be selected based on the selection information after the selection information of the SIM card is recorded in the memory thereby reading/writing necessary information between the SIM card and the communication device.

In order to achieve the above object, according to the present invention there is provided an information processing program of an information processing device having a communication device which communicates with an external communication device through a communication network, comprising a first device driver corresponding to said communication device; a plurality of second device drivers corresponding to a plurality of SIM cards having different recorded information therein; and a switching part which selects a SIM card by switching said second device drivers responding to the SIM card to be selected based on a selection information entered from an input device of said information processing device, or a selection information obtained by an application program to be executed by said information processing device.

According to the structure of the present invention, the switching part is disposed between the first device driver corresponding to the communication device and the plurality of the second device drivers provided for each of the plurality of the SIM cards having different recorded information. When the selection information is received by entering the selection information using the input device of the information processing device, or the application program is executed by the information processing device, the second device driver and its corresponding SIM card are selected responding to the selection information, thus, reading or writing information of the SIM card between the communication device and the SIM card can be performed.

In order to achieve the above object, in the information processing program of an information processing apparatus, said first device driver may comprise a judgment program which identifies a SIM card based on said selection information. The information processing program of an information processing apparatus may further comprise a storage area which stores said selection information.

Other objects, characteristics, advantages of the present invention can be more clearly understood by referring to the attached drawings and each of embodiments of the present invention.

DETAILED DESCRIPTION OF THE PREFERRED EMBODIMENTS

First Embodiment

Figure 4:
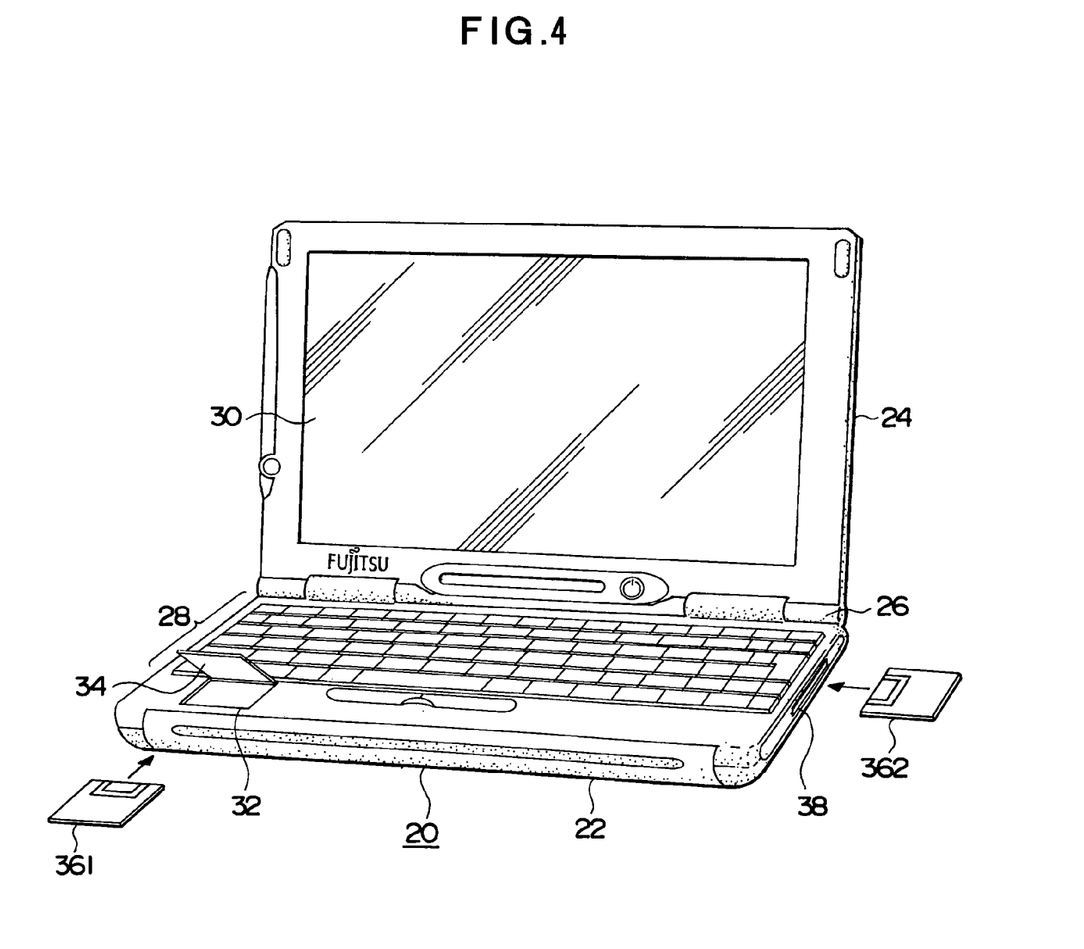
FIG. 4 is a perspective view showing an information processing device of a first embodiment of the present invention.
Figure 5:
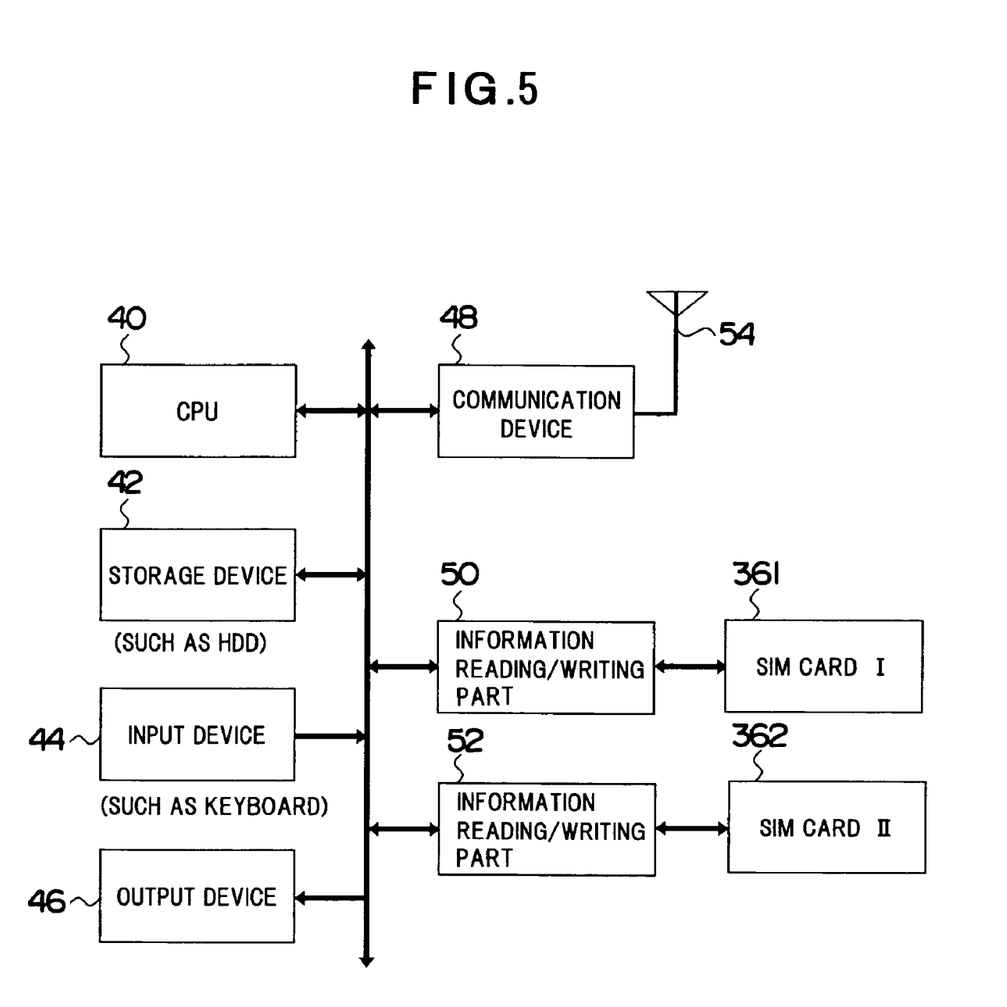
FIG. 5 is a block diagram showing an information processing device of a first embodiment of the present invention.
Figure 6:
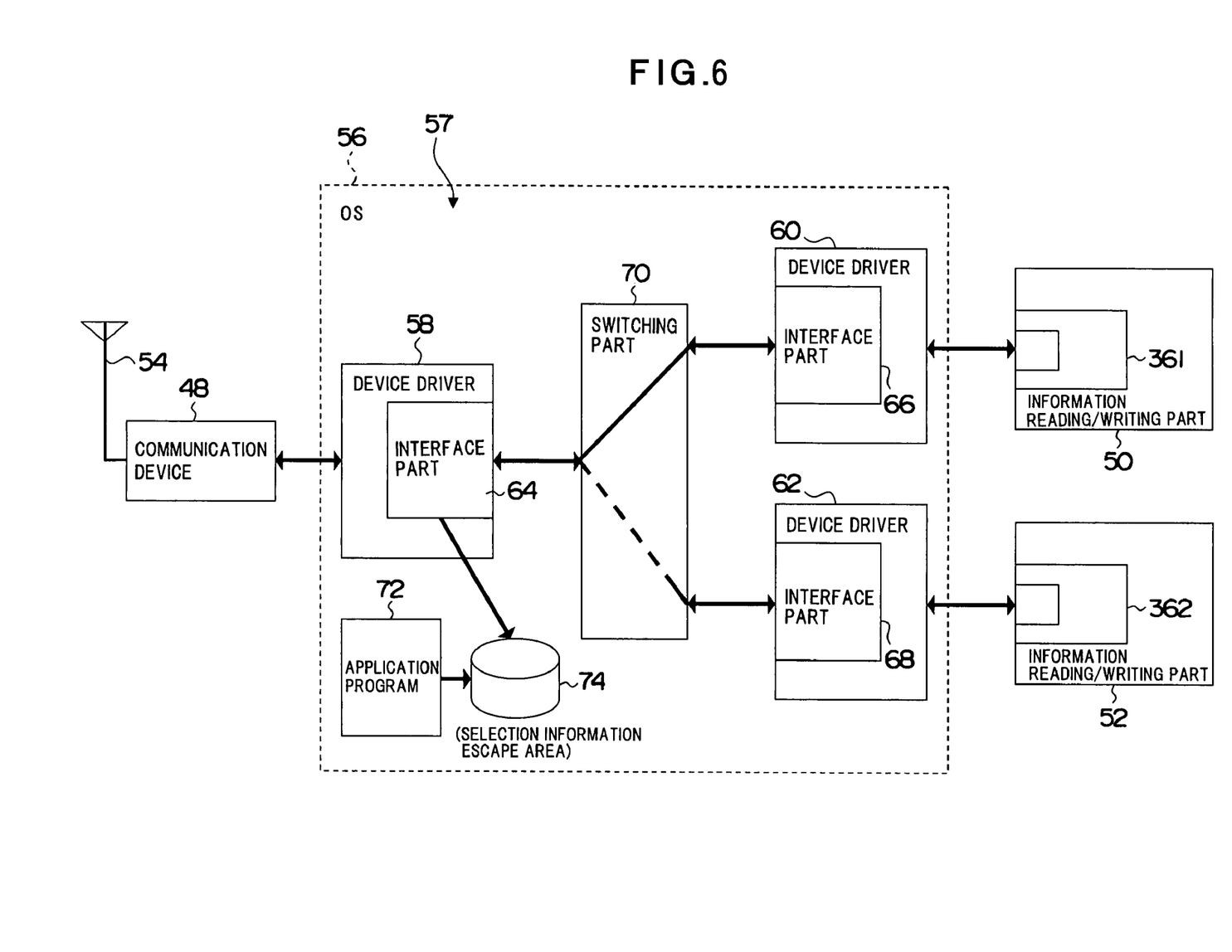
FIG. 6 is a block diagram showing a program operated in an information processing device of a first embodiment of the present invention.
Figure 7:
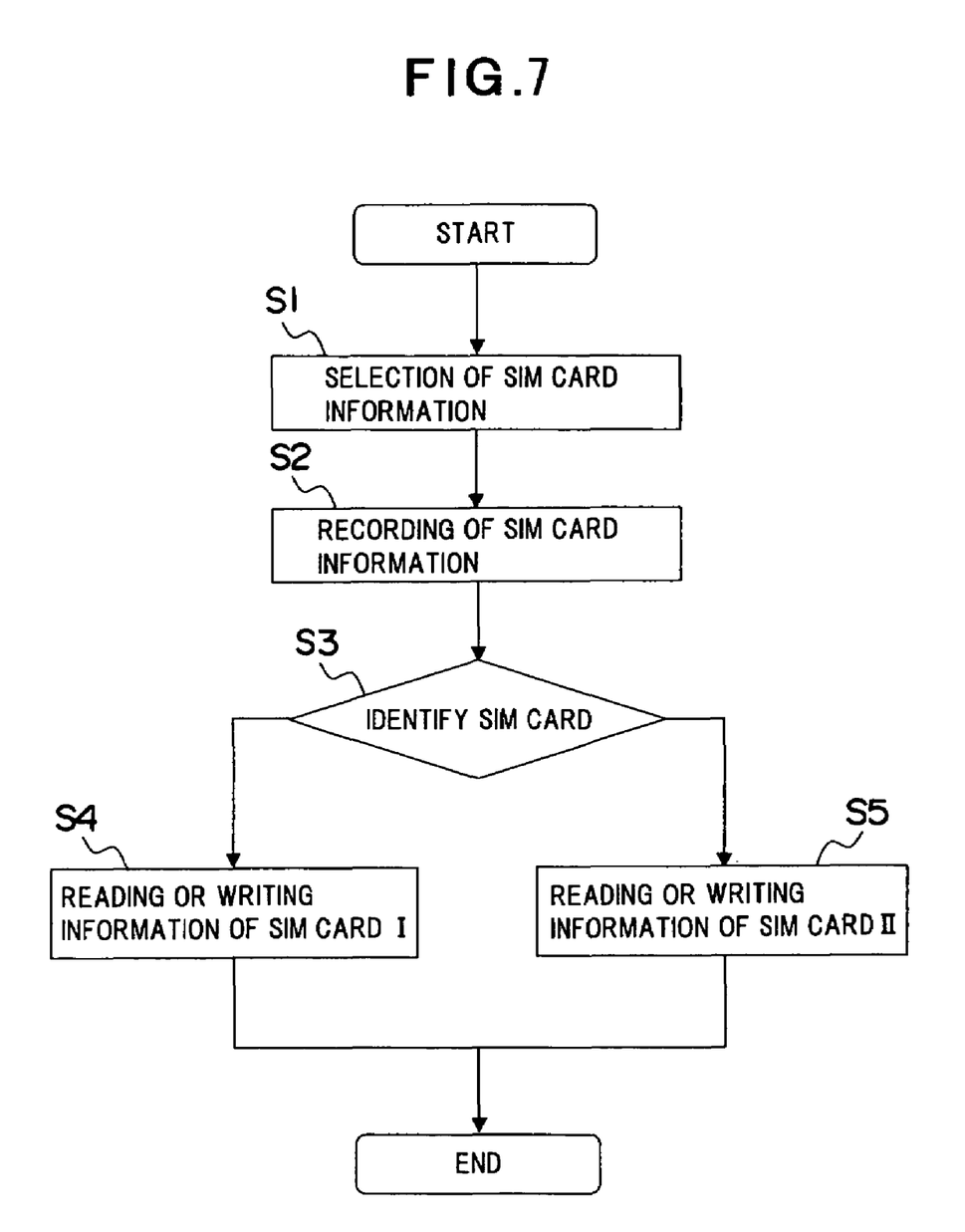
FIG. 7 is a flow chart showing a method of information processing of an information processing device of a first embodiment of the present invention.

The first embodiment of the present invention is described by referring to FIGS. 4-7. FIG. 4 is a perspective view showing a personal computer (PC) as an example of an information processing device. FIG. 5 is a block diagram showing a structure of communication and information processing part of the PC. FIG. 6 is a block diagram showing an outline of an information processing program operated in the information processing device. FIG. 7 is a flow chart showing an example of a method of information processing.

In the first embodiment of the present invention, the personal computer 20 is shown as an example of the information processing device. This personal computer 20 has a main body 22 and a display panel part 24, and they are movably connected by hinge mecchanism 26 to open/close. The main body 22 has a key input part 28 having a plurality of character keys, function keys etc. and a liquid crystal display (LCD) device 30 is installed in the display panel part 24. According to this embodiment, a first card attaching part 32 is formed on the top portion of the main body 22, a first SIM card I 361 is attached to or detached from by opening the lid 34 of the card attaching part 32. A second card attaching part 38 is formed at the side portion of the main body 22. A second SIM card II 362 is attached to or detached from the card attaching part 38. This card attaching part 38 is made up of a slot. The SIM cards I 361, II 362 are IC cards recording a subscriber's information such as an identification number, a telephone number, a telephone directory, a telephone charge, etc., and each of the SIM cards has different information therein.

Any one of the SIM cards can be installed or two of the SIM cards can be installed for communicating with an outside device or processing information by using the subscriber information recorded in each of the SIM cards, I 361, II 362.

The personal computer 20 has, as the block diagram shown in FIG. 5, a central processing unit (CPU) 40 as an information processing part, a storage device 42 including a storage device such as a hard disk drive (HDD) etc. for recording various information including information processing programs, information being processed, etc., an input device 44 such as a key input part 28 for entering information from outside, an output device 46 for generating various information or control outputs for indicating by the LCD device 30 described above, a communication device 48 for communicating with external communication device, and a first and a second information reading/writing parts 50, 52 are provided corresponding to the SIM card I 361 and the SIM card II 362. The communication device 48 has a wireless transmitter/receiver device and a baseband processing device, not shown, for transmitting/receiving information via an antenna 54 using a radio wave.

For example, FIG. 6 of the block diagram shows, a processing program 57 is operated in operating system (OS) 56 as a basic software for the CPU 40 and the storage device 42 of the personal computer 20. The processing program 57 has the first device driver 58 corresponding to the communication device 48, the second device drivers 60, 62 corresponding to each of the information reading/writing parts 50, 52 for installing the SIM card I 361 and the second SIM card II 362 therein. In this block diagram, the device driver 58 is driver software for controlling the communication device 48 as hardware. The device drivers 60, 62 are driver software for controlling the information reading/writing part 50, 52 as hardware and include a part of the operating system 56 or a program controlled by the operating system 56. In addition, the device driver 58 has an interface part 64, and each of the device drivers 60, 62 at the card-installed side have interface parts 66, 68, and the switching part 70 is disposed for selectively switching between the connection of the interface part 64 and the interface part 66 and the connection of the interface part 64 and the interface part 68. The device driver 58 performs switching by the switching part 70.

In addition, this operating system 56 has an application program 72 for executing communication processing and information processing by selecting the SIM card I 361 or the SIM card II 362 and a selection information escape area 74 as a storage area is provided for escaping and recording the selection information by selecting information of any one of the SIM card I 361 and the SIM card II 362.

According to the information processing device described above, the SIM card I 361 is connected with the device driver 60 via the information reading/writing part 50, and the SIM card II 362 is connected with the device driver 62 via the information reading/writing part 52 when the SIM card I 361 being installed in the card attaching part 32, and the SIM card II 362 being installed in the card attaching part 38 thereby either one of SIM cards is activated in a stand-by state for information reading or writing.

The operation of the application program 72 is described referring to the flow chart in FIG. 7. The application program 72 is executed during the stand-by state of the above for selecting an information in the SIM card as a selection information (Step S1), the information of the SIM card is recorded in the selection information escape area 74 as a selection information of the SIM card selected. (Step S2)

The device driver 58 judges the information recorded in the selection information escape area 74 to identify that which one of the information in the SIM card I 361 or the SIM card II 362 having different recorded information is in the selection information escape area 74. (Step S3).

If the SIM card I 361 is selected (Step S4) after this judgment, the device driver 58 and the device driver 60 is connected via the switching part 70 for selecting the SIM card I 361. During this period, the device driver 58 at the side of the communication device 48 and the device driver 60 at the side of the SIM card I 361 are connected via the interface part 64 and the interface part 66. Thus, a read information in the SIM card I 361 is transmitted to the communication device 48 through the information reading/writing part 50 of the SIM card I 361, the device driver 60, the switching part 70 and the device driver 58, and also a write information in the communication device 48 is transmitted to the SIM card I 361 of the information reading/writing part 50 through the device driver 58, the switching part 70 and the device driver 60. Therefore, by selecting the SIM card I 361, information such as a subscriber information etc. read from the SIM card is transmitted to the communication device 48, and the communication device 48 transmits a write information to a memory area such as a memorandum area of the SIM card I 361.

As a result of the above judgment, when the SIM card II 362 is selected (Step S5), the switching part 70 connects the device driver 58 with the device driver 62 to select the SIM card II 362. At this moment, the device driver 58 at the side of the communication device 48 and the device driver 62 at the side of the SIM card II 362 are connected through the interface part 64 and the interface part 68. As a result, a read information in the SIM card II 362 is transmitted to the communication device 48 through the information reading/writing part 52, the device driver 62, the switching part 70 and the device driver 58, and a write information is transmitted from the communication device 48 to the SIM card II 362 of the information reading/writing part 52 through the device driver 58, the switching part 70 and the device driver 62. As a result, the information such as subscriber information etc. read from the SIM card II 362 is delivered to the communication device 48 when the SIM II 362 is selected, and the write information is delivered from the communication device 48 to the SIM card II 362 for writing in the memory or a memorandum area.

As described above, by executing the processing program 57 developed in the operating system 56, or in this embodiment, executing the application program 72, the SIM card I 361 or the SIM card II 362 is selected, information can be transmitted or received to/from the communication device 48 depending on the selected SIM card I 361 or the SIM card II 362, thereby providing necessary information for communication in the SIM card to the communication device 48 or providing the write information from the communication device 48 to either one of the SIM card I 361 or the SIM card II 362 for writing the information therein.

According to this embodiment, by the execution of the application program 72, the selection information is recorded in the selection information escape area 74 for specifying the SIM card I 361 or the SIM card II 362. However, by entering a selection information through the input device 44 and recording the selection information in the selection information escape area 74, a SIM card can be specified by the execution of the device driver 58. In this case, processing can be executed similarly to the flow chart shown in FIG. 7.

Second Embodiment

Figure 8:
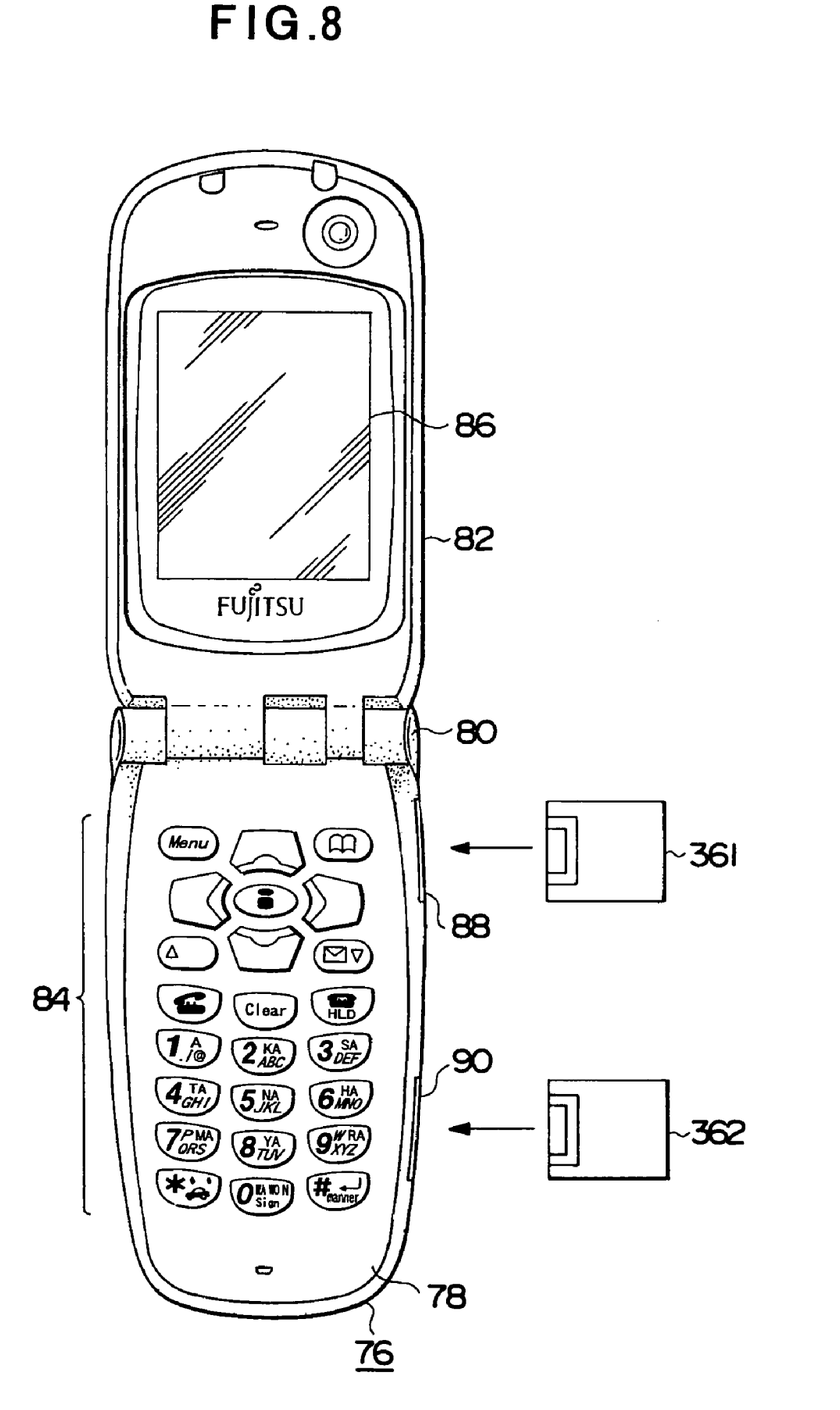
FIG. 8 is an external view showing a mobile phone of a second embodiment of the present invention.

Second embodiment of the present invention is described referring to FIG. 8. FIG. 8 is an external view showing a mobile phone as an example of the information processing device.

In this mobile phone 76 has a main body 78 and a display part 82 attached by a hinge 80 so that the main body 78 and the display part 82 has a folding function to open or close. A key input part 84 is provided on top of the main body 78 having a plurality of keys thereon, which corresponds to the input device 44 in FIG. 5.

And a side portion of the main body 78 of the mobile phone 76, two slots are provided as card attaching parts 88, 90 for first card and second card. The SIM card I 361 is inserted into the card attaching part 88, and the SIM card II 362 is inserted into the card attaching part 90. Description of other structures is similar to the first embodiment so that further description is omitted.

Figure 9:
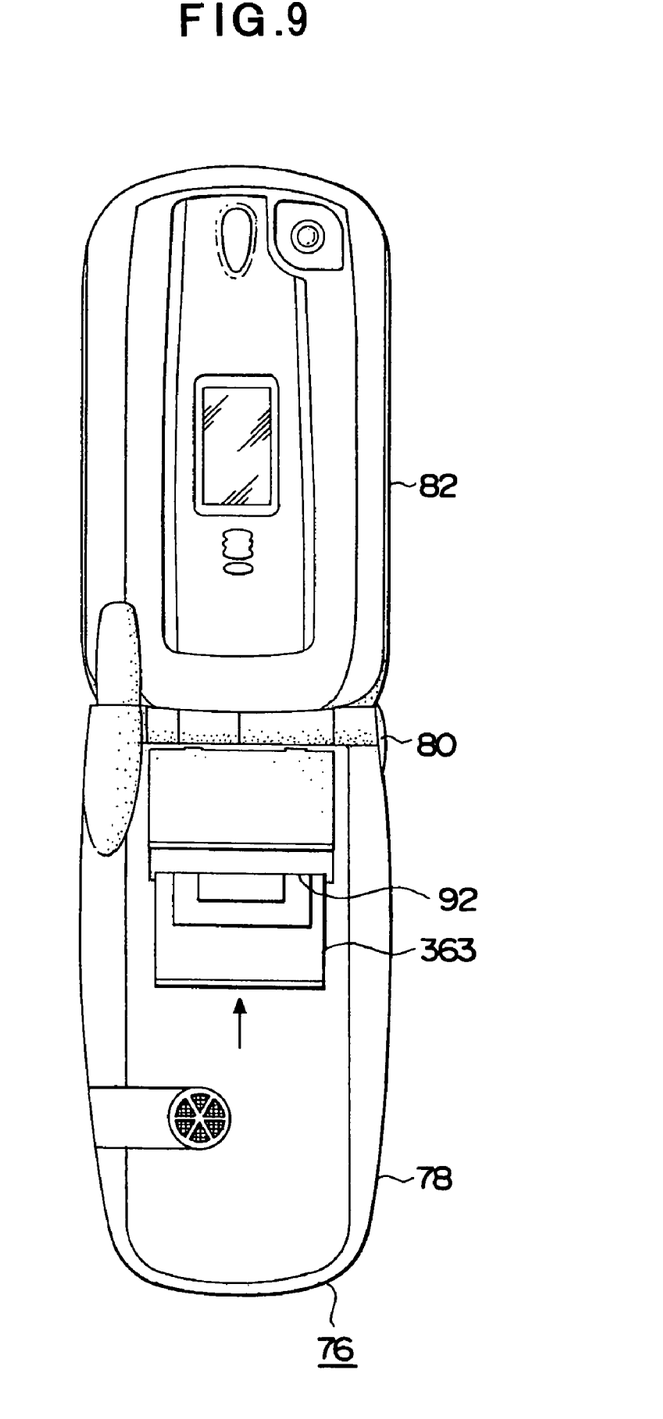
FIG. 9 is an external view showing a mobile phone of a second embodiment of the present invention.

As FIG. 9 shows, at the backside of the mobile phone 76, a third card attaching part 92 can be provided for inserting other SIM card III 363 therein.

In this embodiment, two or three SIM cards having different information therein is exemplified as an example of the information processing device. The present invention can be applicable to the information processing device having four or more of the SIM cards, for example, four or more SIM cards can be replace-ably used for the information processing device having only two card slots.

In addition, in the above embodiments, the personal computer and the mobile phone having a built-in W-CDMA communication device are exemplified, however, the present invention can be applicable to various mobile phones provided with communication systems other than W-CDMA, personal digital assistants (PDA), personal handy phone systems (PHS), handheld personal computers (handheld PC), and other information terminals, digital cameras and other information processing devices.

As described above, most preferred embodiments of the present invention are described. The present invention is not limited to the above description. It is possible to implement various modifications, changes by those skilled in the art based on the best mode of the present invention or claims of present invention disclosed herein, therefore, such modifications, changes are included in the scope of this invention.

According to the present invention, a plurality of the SIM cards having different recorded information such as a subscriber information including identification number, telephone number, telephone directory, telephone charge etc. can be installed. The present invention is useful because reading or writing a information of a SIM card can be performed between a selected SIM card and the communication device by selecting a SIM card out of the plurality of the installed SIM cards thereby improving the usability of communication by selectively using various services provided by SIM card providers.

What is claimed is:

1. An information processing device having a communication device which communicates with an external communication device through a communication network, comprising:
an information processing part, which selects a Subscriber Identity Module card based on a selection information to specify said Subscriber Identity Module card out of a plurality of Subscriber Identity Module cards having different recorded information therein, and reads or writes information of said Subscriber Identity Module card between said Subscriber Identity Module card and said communication device, wherein
the selection information is information which is not dependent on the external communication device,
the information processing part switches a connection between a first device driver that controls the communication device and a plurality of second device drivers that correspond to the plurality of Subscriber Identify Module cards respectively, and controls reading or writing of each of the Subscriber Identify Module cards, and
the Subscriber Identify Module card is selected based on the selection information.

2. The information processing device of claim 1, further comprising:
a plurality of card attaching parts by which the Subscriber Identity Module cards are attached to a housing having at least said information processing part built-in; and
reading/writing part, which reads/writes information of a Subscriber Identity Module card between said Subscriber Identity Module card and said communication device with respect to each card attaching part.

3. The information processing device of claim 1, wherein said selection information is entered from an input device of the information processing device, or obtained by an application program to be executed in the information processing device.

4. A method of information processing of an information processing device having a communication device which communicates with an external communication device, comprising the steps of:
storing a selection information in a storage part of said information processing device, wherein the selection information specifies a Subscriber Identity Module card out of a plurality of Subscriber Identity Module cards having different recorded information therein; and
selecting the Subscriber Identity Module card based on said selection information stored in the storage part, and reading or writing information of said Subscriber Identity Module card between said Subscriber Identity Module card and said communication device, wherein
the selection information is information which is not dependent on the external communication device,
a connection is switched between a first device driver that controls the communication device and a plurality of second device drivers that correspond to the plurality of Subscriber Identify Module cards respectively, and reading or writing of each of the Subscriber Identify Module cards is controlled, and
the Subscriber Identify Module card is selected based on the selection information.

5. An information processing program of an information processing device having a communication device which communicates with an external communication device through a communication network, comprising:
a first device driver corresponding to said communication device;
a plurality of second device drivers corresponding to a plurality of Subscriber Identity Module cards having different recorded information therein; and
a switching part, which selects a Subscriber Identity Module card by switching a connection between the first device driver and the plurality of said second device drivers based on a selection information entered from an input device of said information processing device, or a selection information obtained by an application program to be executed by said information processing device, wherein
the selection information is information which is not dependent on the external communication device.

6. The information processing program of an information processing apparatus of claim 5, wherein said first device driver comprises a judgment program which identifies a Subscriber Identity Module card based on said selection information.

7. The information processing program of an information processing apparatus of claim 5, further comprising a storage area which stores said selection information.

* * * * *